US005308630A

United States Patent [19]
Nordahl

[11] Patent Number: 5,308,630
[45] Date of Patent: May 3, 1994

[54] METHOD FOR PRESERVING SLICED, CORED FRUIT WITH COMPLEMENTARY FOOD CENTER

[76] Inventor: James D. Nordahl, 11035 Mt. Vista Cir. NW., Silverdale, Wash. 98383

[21] Appl. No.: 736,704

[22] Filed: Jul. 26, 1991

[51] Int. Cl.⁵ .......................... B65B 25/02; A23B 7/00
[52] U.S. Cl. ................................... 426/270; 426/324; 426/326; 426/398; 426/412; 426/414; 426/120; 426/124; 53/435; 53/474
[58] Field of Search ............... 426/120, 124, 115, 112, 426/395, 410, 412, 414, 398, 131, 106, 397, 326, 324, 270; 53/424, 435, 515

[56] References Cited

U.S. PATENT DOCUMENTS

| | | | |
|---|---|---|---|
| 1,514,379 | 11/1924 | Fleischer | 426/120 |
| 1,710,164 | 4/1929 | Hefler | 426/120 |
| 2,053,238 | 9/1936 | Dulany . | |
| 2,092,786 | 9/1937 | Taylor | 426/131 |
| 2,140,162 | 12/1938 | McKee | 426/132 |
| 2,186,435 | 1/1940 | Serr | 426/120 |
| 2,229,168 | 1/1941 | Carroll et al. | 426/484 |
| 2,240,522 | 5/1941 | Serr | 426/120 |
| 2,424,536 | 7/1947 | Mayer et al. | 426/120 |
| 3,067,041 | 12/1962 | Montekong | 426/398 |
| 3,328,177 | 6/1967 | Fing | 426/120 |
| 3,365,308 | 1/1968 | Janicke . | |
| 3,418,139 | 12/1968 | Craig . | |
| 3,690,903 | 9/1972 | Thomka | 426/120 |
| 3,753,741 | 8/1973 | Stewart | 426/414 |
| 4,470,241 | 9/1984 | Parry et al. | 53/515 |
| 4,556,147 | 12/1985 | Magnussen, Jr. | 206/493 |
| 4,574,087 | 3/1986 | Sheehy et al. | 426/392 |
| 4,622,229 | 11/1986 | Toshitsugu | 426/395 |
| 4,656,042 | 4/1987 | Risler | 426/398 |
| 4,680,186 | 7/1987 | Sheehy et al. | 426/414 |
| 4,844,243 | 7/1989 | Stiles | 426/120 |
| 4,883,674 | 11/1989 | Fan | 426/118 |
| 4,895,729 | 1/1990 | Powrie et al. | 426/316 |
| 4,899,881 | 2/1990 | Girard et al. | 426/120 |

FOREIGN PATENT DOCUMENTS

| | | | |
|---|---|---|---|
| 3324462 | 1/1985 | Fed. Rep. of Germany | 426/120 |
| 2623781 | 6/1989 | France | 426/120 |

Primary Examiner—Steven Weinstein
Attorney, Agent, or Firm—Christensen, O'Connor, Johnson & Kindness

[57] ABSTRACT

A method and package for packaging and preserving a sliced cored whole fruit (10) together with a complementary food (18). The whole fruit is prepared by coring to define an elongate central passage (12) and slicing the whole fruit into a plurality of radially symmetric segments (14). The segments are assembled in the shape of a whole fruit around a moisture impermeable inner container (16) containing the complementary food. The inner container has approximately the same outer dimensions as the inner dimensions of the central passage so that the inner container essentially fills and displaces the majority of the air from the central passage. The assembled fruit segments and filled inner container are then sealed within an outer container (20).

9 Claims, 5 Drawing Sheets

METHOD FOR PRESERVING SLICED, CORED FRUIT WITH COMPLEMENTARY FOOD CENTER

TECHNICAL FIELD OF THE INVENTION

The present invention relates to methods for preserving and packaging fruit, and more particularly to methods and packages for preserving a sliced, cored whole fruit together with a complementary food center.

BACKGROUND OF THE INVENTION

Due to the growing public awareness of the importance of avoiding excess fat while increasing the consumption of fiber and carbohydrates, fresh fruit is often regarded as the ideal healthful snack. Unfortunately, fresh whole fruit is often avoided in favor of less healthful snack foods because of the inconvenience and mess associated with eating fruit. Instead, people often eat whole fruit such as apples at home by slicing the apple into segments that are convenient and neat to handle and consume. Often people eat fruit such as apples together with complementary foods such as peanut butter, cheese, fudge, popcorn or chocolates.

U.S. Pat. No. 3,418,139 to Craig discloses a method for packaging a piece of segmented fresh fruit, such as an orange or other fruit, in a more convenient form for snacking. The orange is peeled, broken into segments and cleaned. The segments are then reassembled and placed in an fruit-shaped plastic package that includes a tear strip for opening. While the container disclosed is suitable for oranges and is suggested for use with other fruits such as apples, no method is provided for preventing deterioration of the fruit due to introduced microbes and air, which would be present within the cored center and between the segments of the fruit. Further, no accommodation is made for conveniently serving a complementary food with the package orange.

Other methods have been developed for preserving cut fruits to prevent their spoilage until consumption. U.S. Pat. No. 4,883,674 to Fan discloses a method for preserving cut fruit wherein the fruit is treated with a chlorine solution to reduce microbes, sliced, treated with sulfides to reduce enzyme activity, and packaged in a controlled atmosphere within a container including a gas permeable portion. U.S. Pat. No. 4,895,729 to Powrie et al. discloses preserving cut fruit in a controlled atmosphere within a gas impermeable container. The containerized fruit is cold shocked prior to refrigerated storage to further prevent deterioration. U.S. Pat. No. 4,622,229 to Toshitsugu discloses a process for inhibiting ripening of whole apples, wherein the apples are placed together with an ethylene absorbent and a deoxidant in a semi-air permeable bag.

While such methods are suitable for preventing deterioration of fruits, they do not address the packaging and preserving of a sliced cored fruit together with an accompanying food for convenient consumption.

SUMMARY OF THE INVENTION

The present invention provides a method for packaging and preserving a sliced, cored whole fruit together with a complementary food. The whole fruit is first prepared by coring to define an elongate central passage therein, and slicing the fruit into a plurality of segments. The fruit segments are assembled in the shape of the whole fruit around a moisture impermeable inner container containing a complementary food. The inner container has approximately the same outer dimensions as the inner dimensions of the central passage within the fruit, so that the container substantially fills and excludes air from the central passage. The assembled fruit segments and inner container are then sealed within an outer container.

In a further aspect of the present invention, the segmented fruit is treated with a preservation agent prior to inserting the inner container into the central passage within the assembled fruit segments.

In a still further aspect of the present invention, a package is provided for storing a cored and radially segmented fruit together with a complementary food. The package includes a tray formed to define a central receiving mechanism for receiving a first receptacle that contains a complementary food. The tray also defines a plurality of fruit segment recesses disposed in radially spaced relationship around the central receiving mechanism to receive the fruit segments. A lid is engagable with the tray to seal and prevent substantial spillage of the fruit segments and complementary food within the tray.

The method and package of the present invention enables low cost and convenient packaging of a sliced and cored fruit together with a complementary food in a manner which is both convenient for consumption and which prevents degradation of the segmented fruit. The packed and preserved fruit can be stored for up to six weeks while remaining fresh. The inner container containing the complementary food displaces air from the cored center of the fruit that would otherwise serve as a source of oxygen and microbes, thus showing degradation of the fruit. The packaged and preserved fruit is convenient for snacking either at home or in public places, and enables a consumer to eat the segmented fruit together with a favored complementary food in an appealing, non-messy fashion. The present invention thus encourages people to eat economic, healthful snacks such as apples, rather than less healthful foods.

BRIEF DESCRIPTION OF THE DRAWINGS

The present invention will be better understood by those of ordinary skill in the art in view of the following description, when taken in conjunction with the appended figures, in which.

DETAILED DESCRIPTION OF THE PREFERRED EMBODIMENTS

Figure 1:
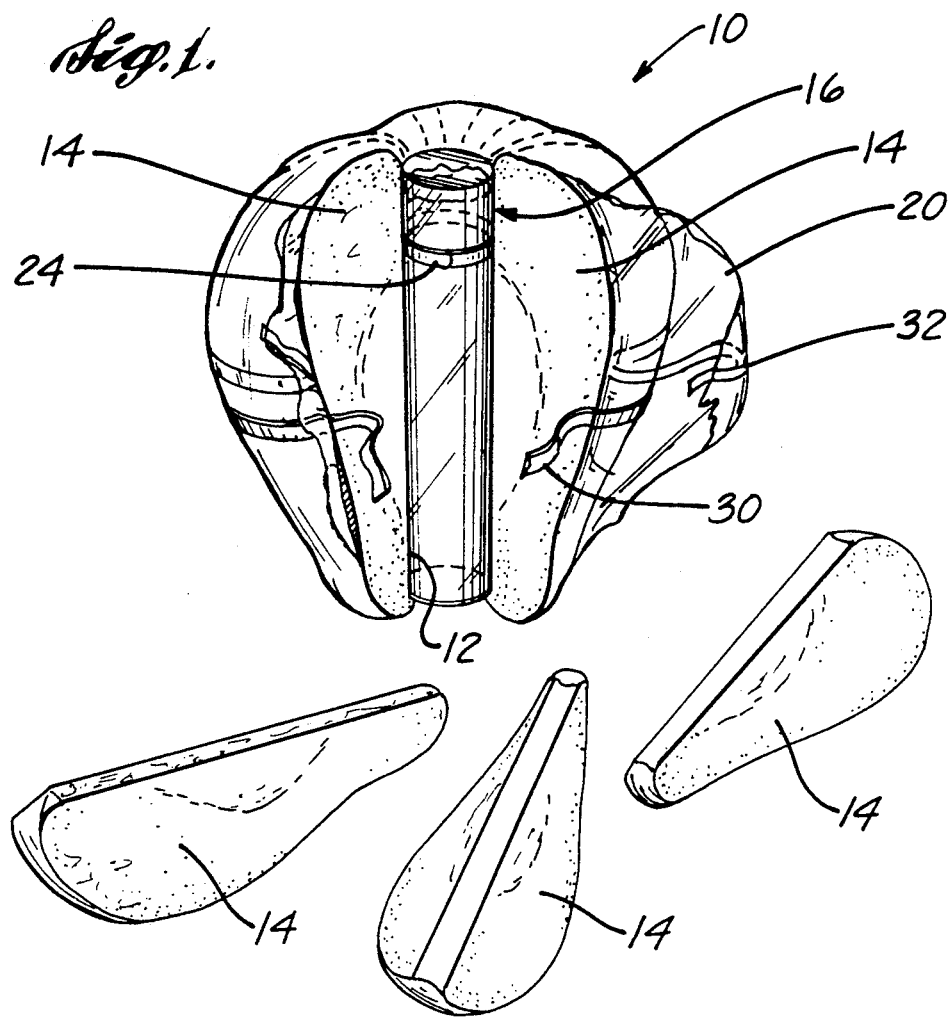
FIG. 1 is a perspective view of a sliced and cored, center-filled apple packaged and preserved in accordance with the present invention, with a portion of the outer container removed and several segments exploded outwardly.
Figure 2:
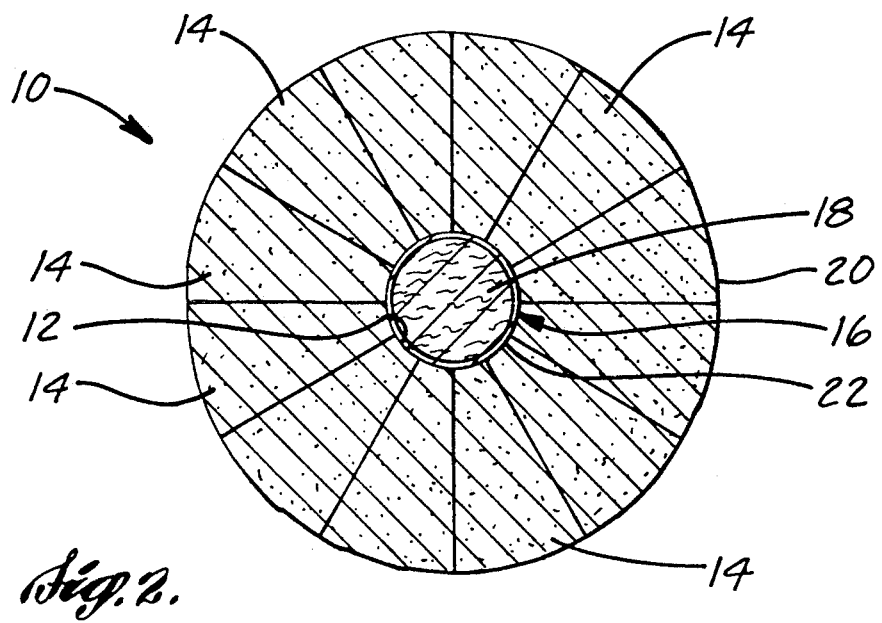
FIG. 2 is a cross-sectional view of a packaged and preserved apple taken substantially along line 2—2 of FIG. 1.

The present invention provides a method and package for preserving a segmented, cored, complementary food center-filled fruit, such as the apple 10 illustrated in FIGS. 1 and 2. The apple is cored to form a central passageway 12 and is sliced into segments 14. The segments are assembled in the original shape of the whole apple, but the core is replaced by an inner container 16 filled with a complementary food item 18. The assembled segments 14 and inner container 16 are sealed within an outer container 20.

The method of the present invention is ideal for packaging apples, which is used as an exemplary fruit throughout this description. However, it should be understood that other similarly configured fruits having a central core of fiber and/or seeds are suitable for use with the present invention. For example, pears and mangoes are well suited for use with the present invention. The complementary food item 18 may be one of a wide variety of liquid or solid foods. For instance, the inner container 16 may be filled with a solid such as hard cheese, a soft paste such as peanut butter, soft cheeses, fudge, small items such as candies or nuts, or sauces such as chocolate or cinnamon-sugar sauces. A wide variety of other suitable complementary food items can be readily imagined.

Fruit packaged and preserved in accordance with the present invention, as illustrated in FIGS. 1-4, can be kept without substantial degradation under refrigerated storage for a period of several weeks, and more particularly for up to six weeks. Thus fruit packaged and preserved in accordance with the present invention may be prepared in quantity and then sold for consumption in retail stores, in restaurants, on board planes and other forms of transportation, in movie theaters, and various other public places, as well as through grocery stores and retail outlets for home consumption.

A preferred embodiment of a packaging and preservation method for long-term storage will now be described in greater detail with reference to FIGS. 1 and 2. Apples are generally received from growers pre-sorted by size and quality. Depending on the supplier, the applies may require washing with a chlorine rinse solution, preferably containing between 100-300 parts per million of chlorine, to remove or kill surface microbes that could cause decay during storage. After washing, if necessary, the apple is prepared by coring and slicing.

Although the apples may be separately cored and then sliced, conventional manual and automated equipment exists for simultaneously coring and slicing the apple. Typically, the calyx (bottom) end of an apple 10 is placed on a centering pin of a machine, and a cutting blade assembly is centered over the opposite, stem end of the apple. The cutting blade assembly is then pushed down through the apple to cut a cylindrical core, containing the stem, fiber center and seeds of the apple, and a plurality of generally radially symmetric segments 14 arranged around the core. The size of the core removed and the number of segments varies depending on the size of the apple. Thus the size of the core to be removed may vary from a diameter of ⅝ inch for "125 size apples" (125 apples packed in a 42-pound box), to up to approximately 1 inch for larger apples (typically packed 72 or 64 in a 42-pound box). The number of segments sliced from the apple can vary as desired, but it has been found that from 6 to 16 segments is well suited for packaging in accordance with the present invention. Most preferably, 10 or 12 segments are formed.

Although the segments 14 of the apple may be allowed to separate during slicing, and then reassembled in the shape of the original whole fruit, it has been found more desirable to hold the segments 14 together to maintain the original shape of the fruit during slicing and later processing. Holding the apple together simplifies handling and rearrangement of the segments 14. Holding the segments together also prevents excess exposure of the sliced surfaces to air, reducing resulting degradation. The slicing operation may be carried out while the apple is immersed in water to further eliminate sources of air.

The segmented apple 10 can be maintained in the assembled whole fruit configuration during processing by placing an elastic band around the circumference of the apple segments 14, using a spring loaded clamp to surround the apple segments 14, or manually grasping the apple segments 14. Thus preferably the apple 10 is sliced to form segments 14 surrounding the apple core, the segments are secured in the assembled configuration, and the core is then pushed or pulled from the center of the apple to leave the central passage 12. The central passage 12 formed by removal of the core is preferably disposed along the central axis of the apple, with the segments 14 being arranged radially about the central passage 12. The core containing the stem and seeds is discarded.

The cored and sliced apple 10 is then preferably treated by spraying with or dipping into a preservative solution to reduce the surface browning enzyme action that discolors the fruit during storage. The preservative solution can comprise an aqueous solution of one or more various commercially available preservative agents. For example, a dilute solution of a sulfide such as sodium bisulfate, ascorbic acid, citric acid, and sodium chloride are all suitable for use. For shorter term storage, lemon juice may be used as a natural preservative.

After treating with the preservative solution, excess solution and moisture is removed from the apple segments by air blowing, draining or centrifugation.

The inner container 16 may then be inserted into the central passage 12 to assemble the segments 14 around the inner container 16. The exterior of the inner container 16 has substantially the same diameter and length as the core that was removed from the apple 10, and thus has the same outer dimensions as the inner dimensions of the central passage 12. As described above, the size of the core, and thus the inner container 16, varies depending on the size of the apple. The sizing of the inner core 16 is important to displace and exclude the majority of air from the center of the apple, thus eliminating much of the oxygen that could lead to degradation of the apple during storage. The container 16 also serves to hold the complementary food item 18.

The assembled segmented and cored apple 10, including the inserted inner container 16 containing the complementary food 18, is then preferably surrounded by a constricting band 30 to secure the segments together in the shape of the whole apple. The purpose of the band 30 is to constrain and hold together the apple segments to prevent shifting of the apple segments, which would expose the cut segment surfaces to gases within the package. If a band was previously installed after slicing the apple 10, the same band may be used at this stage. If not, a new band 30 is installed. The band may be constructed from plastic, such as a heat-shrinkable plastic, rubber or other elastomer, a wire twist-tie, or other suitable materials. The use of the band 30 may not be necessary if the container 20 is closely sized to the apple, but is preferred.

The banded, segmented and center filled apple 10 is then placed into the outer container 20. The outer container 20 serves to further constrain and hold together the segments 14, as well as to exclude large quantities of excess air from the apple 10, while permitting limited respiration, as shall be described subsequently. The outer container 20 is then sealed, as shall be described. The sealed, packaged apple can then be stored under refrigeration for a period of up to six weeks, at a temperature above 32° F., and preferably between 33° F. and 40° F.

The exact construction of the containers 16 and 20 will now be described. Conventional coring and slicing equipment removes a cylindrical core from apples, thus leaving a cylindrical passage 12. The inner container 16 is thus preferably configured as a tube having a thin sidewall 22 that is sealed at either end. The inner container 16 is formed from a moisture and odor impermeable material to protect the complementary food 18 from the apple juices, and also protect the apple segments 14 form absorbing odors of the complementary food 18. Most preferably, the inner container is formed from a food grade thermoplastic, such as polyethylene or polystyrene, or a plastic laminated metal foil.

Various known plastics processing techniques can be used to form the inner container 16. One suitable method of making the container 16 is to roll a flexible elongate sheet into a tube which is then adhered along a longitudinal seam line. Top and bottom caps are then adhered to seal the inner container 16. Methods of adhering the seam line and caps include adhesive bonding, thermal welding and ultrasonic welding. Alternatively, the inner container 16 can be formed from an extruded tube of material which is then filled with the complementary food item. The ends of the tube can be sealed by ultrasonic or thermal welding to form the inner container 16.

Regardless of the processing techniques used to form the inner container 16, the inner container 16 preferably includes an opening mechanism such as a conventional tear strip 24 to allow convenient opening of the inner container 16 by a consumer. A cap including a conventional pull-tab could be used in place of the strip.

Figure 3:
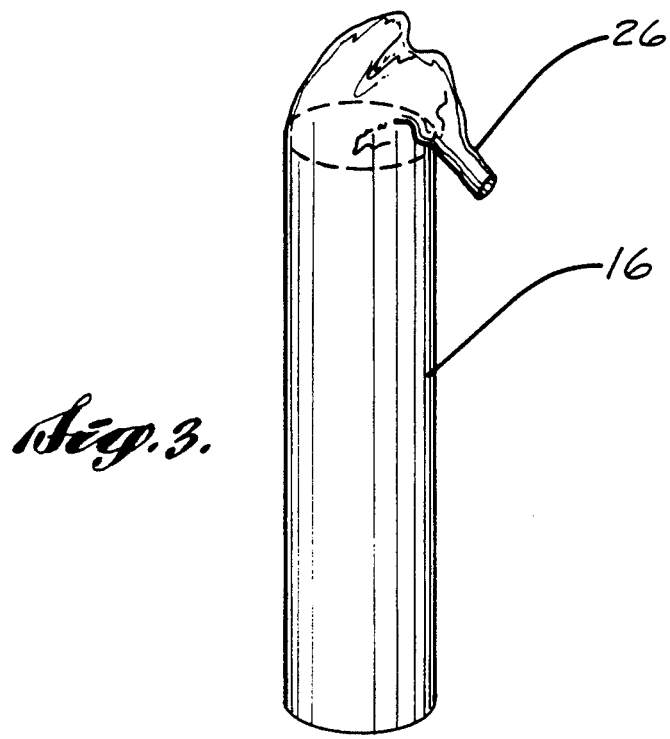
FIG. 3 is a side elevation view of a deformable inner container with an integral spout for soft complementary foods.

For soft, flowable complementary foods 18, such as soft cheeses, peanut butter, or liquid chocolate, an inner container 16' can be formed from a flexible, deformable material, and configured to include an integral spout 26, as shown in FIG. 3. The spout 26 can be formed from a narrow portion of the tubular container that is folded over the remainder of the inner container 16' for insertion into the cored apple 10. The spout 26 can be torn by the ultimate consumer to allow extrusion of the food 18 upon squeezing of the inner container.

The outer package 20 can also be formed in a variety of conventional methods from a thermoplastic material. Referring to the preferred embodiment of FIG. 1, the outer package 20 illustrated is formed from a flexible thermoplastic film that surrounds the apple 10. The film is configured as an open envelope into which the apple 10 is inserted. The envelope is then evacuated of air by drawing a vacuum, which collapses the envelope around the apple 10 to form a closely conforming container 20. The open end of the evacuated container 20 is then closed and sealed by thermal welding, adhesive sealing or ultrasonic welding. This envelope-type outer container 20 preferably includes a conventional tear strip 32 for ease of tearing the container open.

Rather than using a vacuum sealed outer container 20, the container 20 could be constructed from a heat shrinkable envelope that is sealed over the apple and is then heat shrunk to surround and conform to the apple. In either case, the outer container 20 is preferably formed from a semi-gas permeable material i.e., a material that is permeable to oxygen and carbon dioxide and permits a limited flow of such gases therethrough. Suitable permeable materials are disclosed by U.S. Pat. No. 4,883,674, and include low density polyethylene fabricated with an extruded coating of ethylene vinyl acetate, or a laminated film comprised of polycarbonate and ethylene vinyl acetate layers. The gas permeable outer container 20 preferably operates to maintain the oxygen level within the outer container 20 at a level greater than 1% to prevent anaerobic respiration of the fruit, which significantly degrades the quality of the fruit. Thus, an outer container 20 having at least a portion constructed from a permeable film permitting 5-10 cc of oxygen per day per ounce of fruit to enter the container is preferred.

Figure 4:
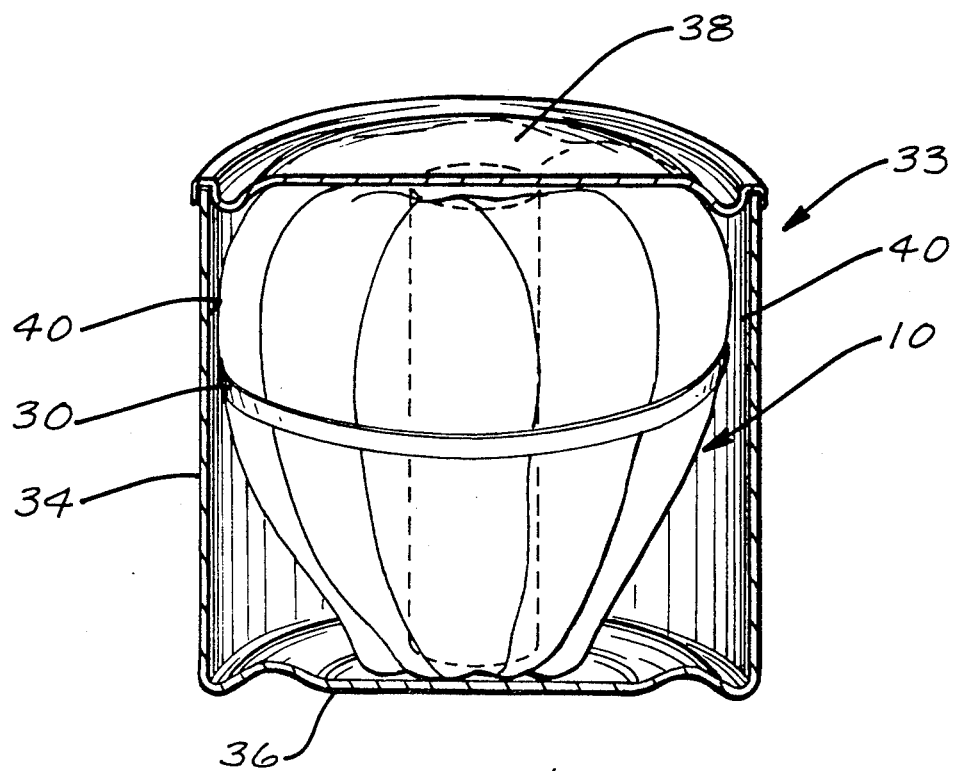
FIG. 4 is a side elevation view of a sliced, cored, center-filled apple packaged and preserved in accordance with an alternate embodiment of the present invention.

An alternate embodiment of an outer container 33 for packaging a segmented, cored, center-filled apple 10 is shown in FIG. 4. The apple 10 is identically prepared as for placement within the previously described outer container 20, and includes a band 30 placed around its circumference prior to placement in the outer container 33. The outer container 33 is configured as a tube having a sidewall 34, bottom 36, and top 38.

The bottom 36 may be integrally formed with the sidewall 34, as shown in FIG. 4. The diameter and height of the outer container 33 is sized to correspond to the diameter of the apple 10 to enable the container to surround and conform generally to the apple 10, aiding in maintaining the segments 14 assembled together. The top 38 and bottom 36 of the outer container 33 may be contoured to conform to the top and bottom of the apple to further aid in holding the segments 14 together.

The top 38 may be either snapped on to the container 33, or sealed on by heat sealing, adhesive bonding or ultrasonic welding. The outer container 33 also preferably includes a conventional tear strip 40 to facilitate easy opening of the outer container. Alternatively, a conventional pop-top type lid opening device could be utilized.

The outer container 33 preferably has at least one portion formed from a semi-gas permeable plastic material. Thus, the sidewall 34, bottom 36 and top 38 may all be constructed from a semi-gas permeable plastic film. Alternatively, just the top 38 can be construed from a permeable material, with the balance of the container constructed from a plastic laminated or impregnated paper board.

It should also be apparent that rather than being separately formed, the other container 38 and inner container 16 can be integrally formed. Thus, a one-piece molding (not shown) would form the open ended outer container and have an inner annular well forming the open ended inner container. A single top could the used to seal both the inner and outer container.

A still further aspect of the present invention will now be described with reference to FIGS. 5-9. An alternate package 50 shown is used when the segmented apple 10 and complementary food is to be consumed immediately after preparation, such as at point of sale, or stored for short term, i.e., up to four days. The package 50 includes a tray 52 and lid 54. Referring to FIGS. 5-9, the tray 52 is upwardly concave and dish shaped. The tray 52 includes a cylindrical central recess 55 that has sidewalls 56 (FIG. 7) that bevel inwardly from bottom to top. A cup-shaped first receptacle 58 is received within the central recess 55. Preferably the receptacle 58 has an annular flange 60, formed about its bottom edge that is beveled correspondingly to the sidewalls 56 of the central recess 55. The annular flange 60 snaps into and engages with the beveled sidewalls 56 of the receptacle 54. The first receptacle 58 receives a complementary food, such as the various solids, liquids or pastes described previously. The tray 52 also is formed to define a plurality of fruit segment recesses 66 that are evenly spaced apart and extend radially from the central recess 55 of the tray 52. The number of fruit segment recesses 66 corresponds to the number of segments into which the fruit is sliced.

Each recess 66 is generally configured in the shape of an apple segment. Each recess 66 is elongate and eye shaped, with each recess 66 tapering in width from the center of the recess 66 towards both the central recess 55 and towards the rim 68. The bottom surface of each recess 66 is upwardly concave and is angularly disposed on a slant extending upwardly and outwardly from the center of the tray. Thus, when an apple segment (not shown) is received in a recess 66, the segment inclines upwardly from the center of the tray 52 to the outer rim 68.

Figure 7:
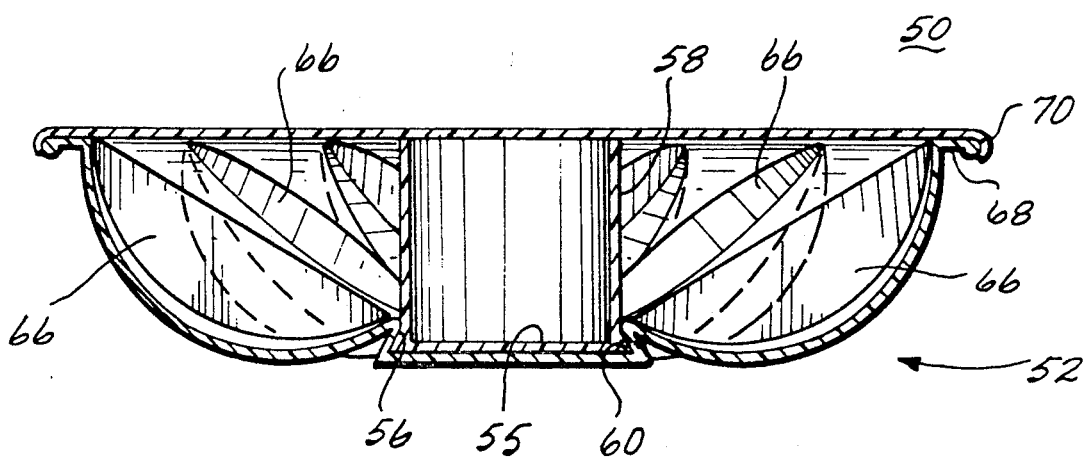
FIG. 7 is a cross-sectional side-elevation view of the tray and lid of FIG. 5 taken along the line 7—7 in FIG. 6.
Figure 9:
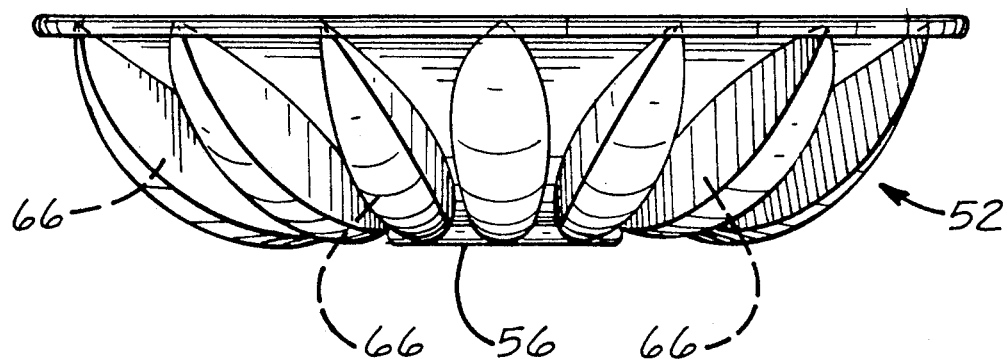

The outer perimeter edge of the tray 52 is formed into a rim 68 to strengthen the tray and enable closure of the tray with the lid 54. As shown in FIG. 7, the lid 54 has a downturned edge 70 that catches and engages with the rim 68 of the tray 54.

Figure 5:
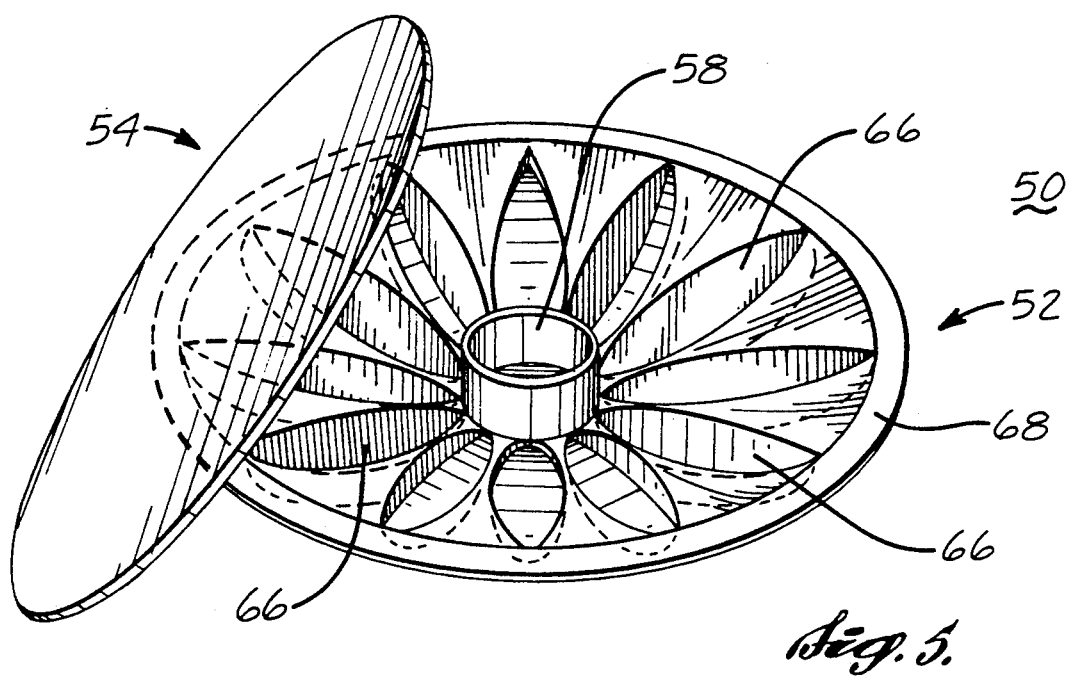
FIG. 5 is a perspective view of a tray and lid for storing fruit and complementary food preserved in accordance with a further aspect of the present invention.
Figure 6:
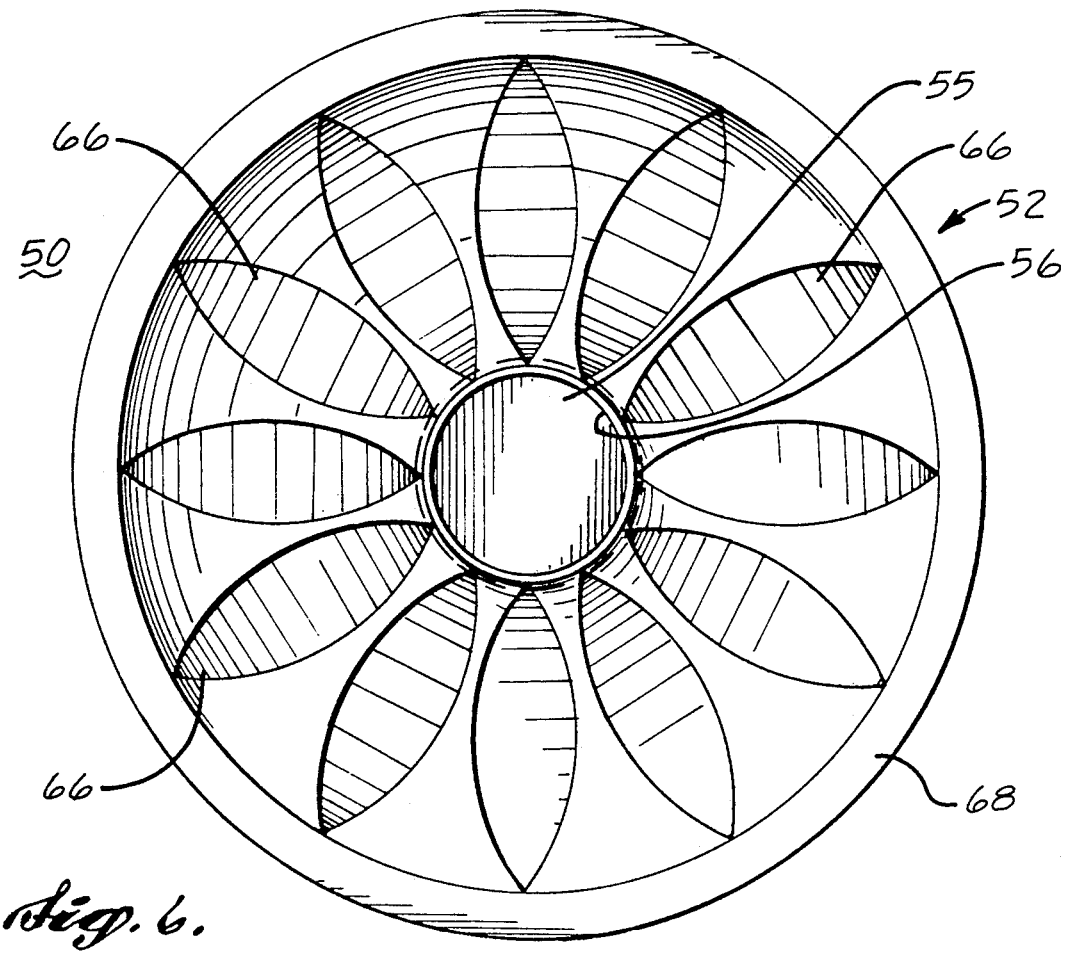
FIG. 6 is a top plan view of the tray of FIG. 5.
Figure 8:
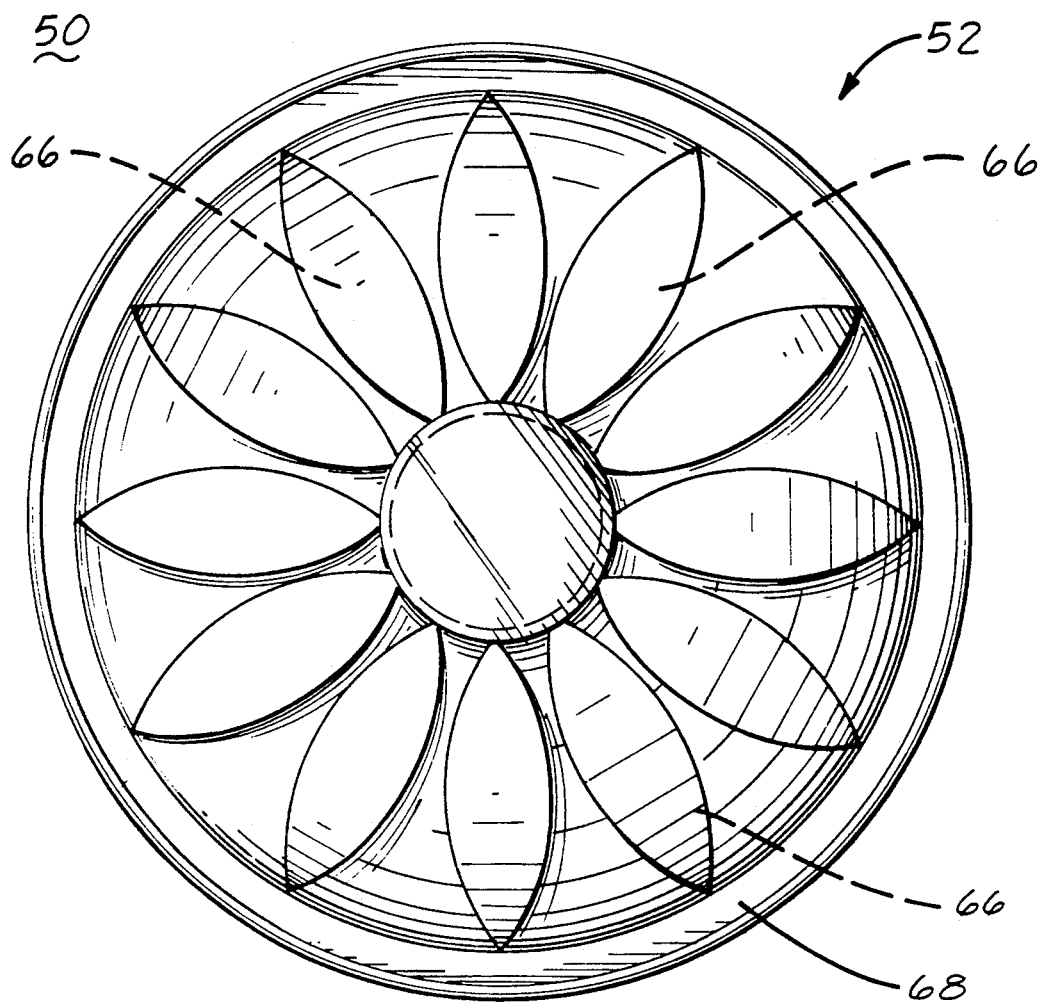
FIGS. 8 and 9 are bottom plan and side elevation views, respectively, of the tray of FIG. 5.

The method of preparing and packaging fruit, such as an apple, for placement within the package 50 shall now be described with relation to FIGS. 5 through 7. The apple is cored and sliced into segments in the same manner as previously described for the center filled apple 10. If the apple is to be stored within the package 50 for a period of up to four days, the segments 70 are preferably treated with one of the previously listed preservative agents. Because of this relatively short duration of storage, lemon juice has been found to be a preferred preservative agent as it is sufficient to prevent surface browning and is attractive to consumers. Rather than being held together in the shape of the whole fruit, the segments 30 are arranged in the recesses 66 of the tray 52, with one segment being received in each recess, skin side down, in a flower petal arrangement. The first receptacle 58 containing the complementary food item is then snapped into place within the central recess 55. The lid 54 is then snapped on to the tray 52 to prevent spillage of the complementary food and apple segments within the tray.

The tray 52, first receptacle 62 and lid 70 can be formed of impregnated or coated paperboard, or from a molded or vacuum formed thermoplastic sheet. Preferably, at least one portion of the tray 52 or lid 54 is formed from a semi gas-permeable material to allow aerobic respiration of the fruit, as described previously.

The packaged fruit can then be stored within the package 50 under refrigeration at a temperature above 32° F., and preferably between 33° F. and 40° F., for a period of up to about four days.

Although the first receptacle 58 has been illustrated as a cylindrical tube, it should be apparent that other shapes for the first receptacle could be used depending on the type of complementary food. For example, the top of the first receptacle 58 can be flared outwardly to allow containment of a larger volume of the complementary food. Further, rather than a separate first receptacle 58 and tray 52, it should be apparent that the first receptacle could be formed integrally with the tray.

The present invention has been described in relation to several preferred embodiments and variations thereof. One of ordinary skill after reading the foregoing specification will be able to affect various changes, alterations and substitutions of equivalents without departing from the broad concepts disclosed. It is therefore intended that the scope of Letters Patent granted hereon be limited only by the definition contained in the appended claims and the equivalents thereof.

The embodiments of the invention in which an exclusive property of privilege is claimed are defined as follows:

1. A method for packaging and preserving a segmented whole fruit together with a complementary food, comprising the steps of:
   (a) coring a whole fresh, juice-containing fruit to define a central passage, and radially slicing the fruit into a plurality of radial segments;
   (b) assembling the fruit segments in the shape of the whole fruit around a moisture impermeable inner container containing a complementary food to be consumed with said fruit segments, wherein the inner container has approximately the same outer dimensions as the inner dimensions of the central passage within the fruit, so that the inner container substantially fills and excludes air from the central passage; and
   (c) sealing the assembled fruit segments and the inner container within an outer container.

2. The method of claim 1, wherein the complementary food is flowable and the inner container is deformable to disperse the complementary food therefrom.

3. The method of claim 1, wherein the step of assembling the fruit segments includes the substeps of:
   (a) maintaining the fruit segments together in the shape of the cored, whole fruit; and
   (b) inserting the inner container, containing a complementary food, into the central passage.

4. The method of claim 3, wherein the fruit segments are maintained together by a constrictive band placed around the fruit segments.

5. The method of claim 1, further comprising the steps of treating the fruit segments with a preservative agent prior to assembling the fruit segments around the inner container.

6. The method of claim 1, further comprising the step of refrigerating the sealed outer container containing the fruit at a temperature of from greater than 32° F. to 40° F.

7. The method of claim 6, wherein at least a portion of the outer container is formed from a material that is semi-gas permeable.

8. The method of claim 1, wherein the sealed outer container is configured to generally conform to the shape of the assembled fruit segments.

9. The method of claim 8, further comprising the step of evacuating air from within the outer container to conform the outer container to the shape of the assembled fruit segments.

* * * * *